US009997000B2

(12) United States Patent
Kimura et al.

(10) Patent No.: US 9,997,000 B2
(45) Date of Patent: Jun. 12, 2018

(54) DOOR UNLOCKING SYSTEM AND DOOR UNLOCKING METHOD

(71) Applicant: Murata Manufacturing Co., Ltd., Nagaokakyo-shi, Kyoto-fu (JP)

(72) Inventors: Ikuhei Kimura, Nagaokakyo (JP); Makoto Yasutake, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days. days.

(21) Appl. No.: 15/260,433

(22) Filed: Sep. 9, 2016

(65) Prior Publication Data

US 2016/0379430 A1 Dec. 29, 2016

Related U.S. Application Data

(63) Continuation of application No. PCT/JP2015/056137, filed on Mar. 3, 2015.

(30) Foreign Application Priority Data

Mar. 13, 2014 (JP) .................................. 2014-050638

(51) Int. Cl.
*G08C 17/02* (2006.01)
*G07C 9/00* (2006.01)
(Continued)

(52) U.S. Cl.
CPC ........ *G07C 9/00309* (2013.01); *B60R 25/245* (2013.01); *G06F 21/35* (2013.01);
(Continued)

(58) Field of Classification Search
CPC ........ G07C 9/00309; G07C 2009/0042; G07C 2009/00476; G07C 9/00111; B60R 25/245
(Continued)

(56) References Cited

U.S. PATENT DOCUMENTS

2009/0221298 A1* 9/2009 Hanner ................... G01C 21/08
455/456.1
2013/0278390 A1* 10/2013 Cristache ............... G01S 13/876
340/10.1
2014/0114503 A1* 4/2014 Ghabra .................... H04Q 9/00
701/2

FOREIGN PATENT DOCUMENTS

JP 2007-297774 A 11/2007
JP 2009-2034 A 1/2009
(Continued)

OTHER PUBLICATIONS

Model S Manual Screencap;s (and some others) | Tesla Motors Club, Teslamotorsclub.com May 2012.*
(Continued)

*Primary Examiner* — Steven Lim
*Assistant Examiner* — Mancil Littlejohn, Jr.
(74) *Attorney, Agent, or Firm* — Keating & Bennett, LLP

(57) ABSTRACT

An electronic key actively executes wireless communication following a keyless entry communication and passively executes wireless communication following a RFID communication. A vehicle control device is mounted on a vehicle and actively executes wireless communication following each of the keyless entry communication and RFID communication. An ECU/BCM unlocks a door by communicating with the electronic key using the keyless entry communication and issues a password to the electronic key in relation to this action. When a door knob or handle is pulled, an RFID-IC acquires the password issued by the ECU/BCM from the electronic key using the RFID communication and unlocks the door by authenticating the acquired password.

19 Claims, 9 Drawing Sheets

(51) Int. Cl.
    *B60R 25/24*        (2013.01)
    *G06F 21/35*        (2013.01)
(52) U.S. Cl.
    CPC .......... *G07C 9/00111* (2013.01); *G08C 17/02* (2013.01); *G07C 2009/00793* (2013.01); *G07C 2209/62* (2013.01); *G07C 2209/63* (2013.01); *G08C 2201/61* (2013.01)
(58) Field of Classification Search
    USPC ......... 340/5.61, 5.62, 5.63, 5.64, 5.31, 5.72, 340/426.3, 426.36, 426.16, 426.17, 340/825.69, 825.72
    See application file for complete search history.

(56)  References Cited

FOREIGN PATENT DOCUMENTS

| | | |
|---|---|---|
| JP | 2009-64180 A | 3/2009 |
| JP | 2009064180 A * | 3/2009 |

OTHER PUBLICATIONS

English translation of Official Communication issued in corresponding International Application PCT/JP2015/056137, dated May 26, 2015.

* cited by examiner

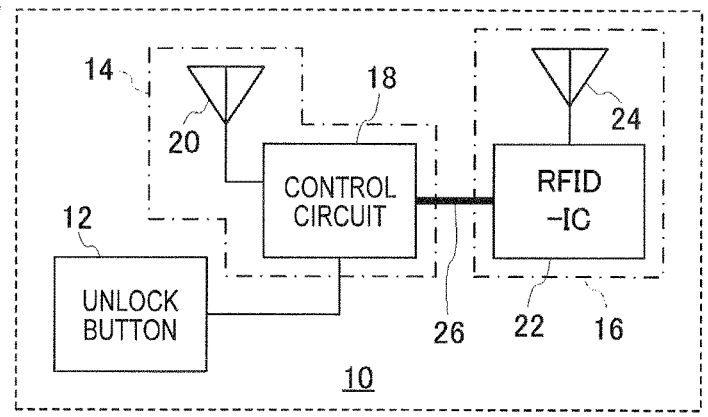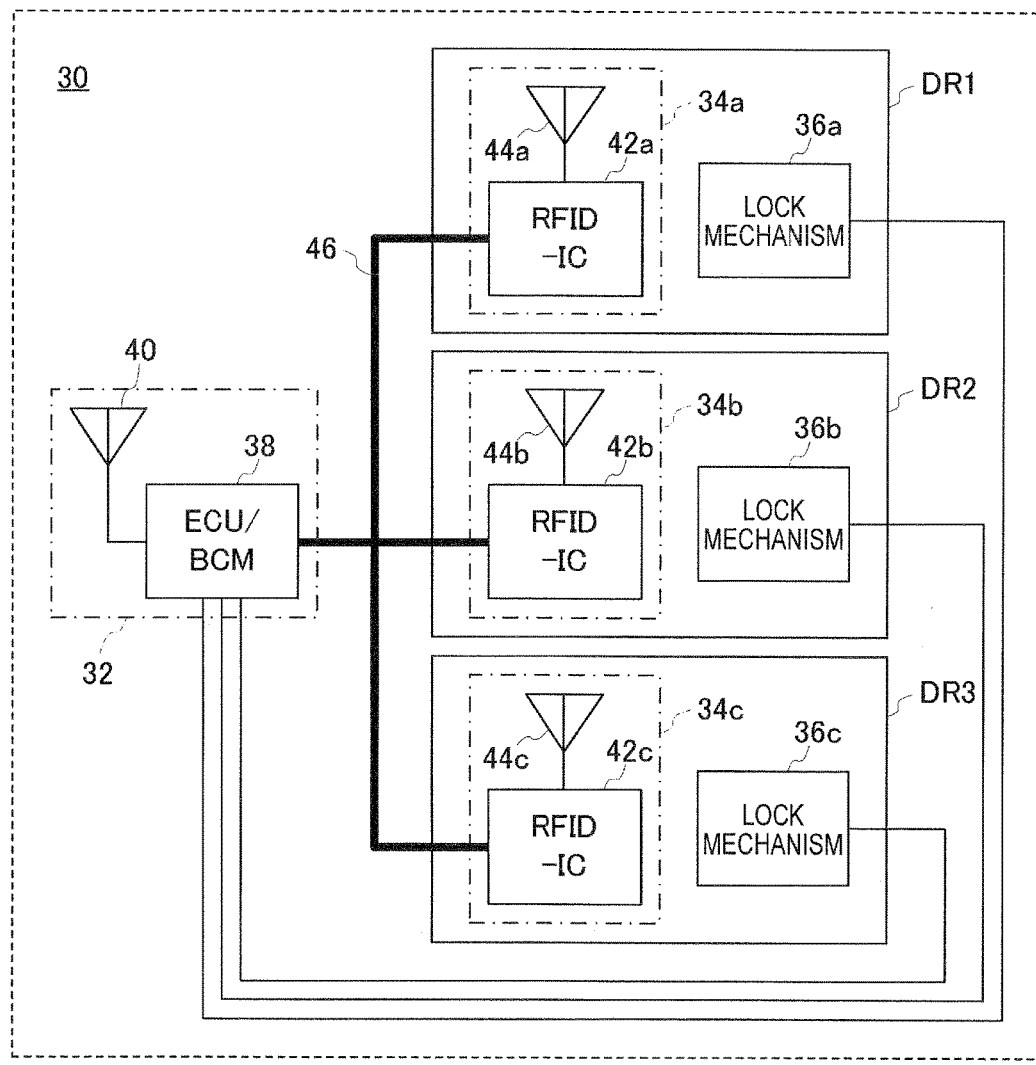

DOOR UNLOCKING SYSTEM AND DOOR UNLOCKING METHOD

CROSS REFERENCE TO RELATED APPLICATIONS

This application claims the benefit of priority to Japanese Patent Application 2014-050638 filed on Mar. 13, 2014 and is a Continuation Application of PCT/JP2015/056137 filed on Mar. 3, 2015, the entire contents of each application are hereby incorporated herein by reference.

BACKGROUND OF THE INVENTION

1. Field of the Invention

The present invention relates to a door unlocking system and a door unlocking method and, more particularly, relates to a door unlocking system and a door unlocking method for unlocking a door of a vehicle through a wireless communication between an electronic key carried by a user and an in-vehicle device.

2. Description of the Related Art

A keyless entry system is known that unlocks a door of a vehicle through a wireless communication between an electronic key (portable device) carried by a user and an in-vehicle device. The electronic key has a built-in battery used as a power source for executing the wireless communication and a signal process with the vehicle. However, since the wireless communication and the signal process can no longer be executed if the battery of the electronic key loses all charge and dies, the electronic key is normally provided with a mechanical key (mechanical key) in preparation therefor.

In this regard, for example, JP 2007-297774 A discloses a system to which a communication system (a system utilizing a transponder activated by an activating radio wave) different from the keyless entry system is added so that this communication system is used in case of the battery losing all charge. This system enables locking/unlocking of a door without using the mechanical key when the battery of the electronic key losing all charge.

However, the locking/unlocking of a door is performed by using individual identification information of a transponder itself and this individual identification information is relatively simple, resulting in a problem that security is not as high as the keyless entry system.

SUMMARY OF THE INVENTION

Preferred embodiments of the present invention provide a door unlocking system and a door unlocking method enabling unlocking of a door while maintaining security even after a battery of a portable device loses all power or dies.

A door unlocking system according to a preferred embodiment of the present invention is a door unlocking system including a portable device carried by a user, the portable device actively performing a wireless communication following a first short-range wireless communication mode and passively performing a wireless communication following a second short-range wireless communication mode; and an in-vehicle device mounted on a vehicle having a door, the in-vehicle device actively performing a wireless communication following the first short-range wireless communication mode and a wireless communication following the second short-range wireless communication mode, the in-vehicle device including a first unlocking actuator communicating in the first short-range wireless communication mode with the portable device to unlock the door and a password generator issuing a password to the portable device in association with a process of the first unlocking actuator, the portable device including a storage storing a password issued by the password generator, the in-vehicle device further including a password acquirer acquiring a password stored by the storage in the second short-range wireless communication mode when a predetermined operation to the vehicle is performed, and a second unlocking actuator authenticating the password acquired by the password acquirer to unlock the door.

Preferably, a communication range following the first short-range wireless communication mode is larger than a communication range following the second short-range wireless communication mode, and the password generator issues the password in the first short-range wireless communication mode.

Preferably, the portable device further includes an indicator notifying the in-vehicle device of an unlocking operation by the user in the first short-range wireless communication mode, and the first unlocking actuator unlocks the door in response to a notification from the indicator.

Preferably, the password generator updates contents of the password for each issuance, and the password acquirer acquires a plurality of passwords already issued by the password generator for each authentication.

Preferably, the predetermined operation is an operation of pulling a door knob or handle.

A door unlocking method according to a preferred embodiment of the present invention is a door unlocking method performed by a door unlocking system including a portable device carried by a user, the portable device actively performing a wireless communication following a first short-range wireless communication mode and passively performing a wireless communication following a second short-range wireless communication mode, and an in-vehicle device mounted on a vehicle having a door, the in-vehicle device actively performing a wireless communication following the first short-range wireless communication mode and a wireless communication following the second short-range wireless communication mode, the method including a first unlocking step in which the in-vehicle device communicates in the first short-range wireless communication mode with the portable device to unlock the door; an issuing step in which the in-vehicle device issues a password to the portable device in association with a process of the first unlocking step; a storing step in which the portable device stores a password issued in the issuing step; an acquiring step in which the in-vehicle device acquires a password stored in the storing step in the second short-range wireless communication mode when a predetermined operation to the vehicle is performed; and a second unlocking step in which the in-vehicle device authenticates the password acquired in the acquiring step to unlock the door.

While the battery of the portable device still works, the in-vehicle device communicates in the first wireless communication mode with the portable device to unlock the door of the vehicle and issues a password to the portable device. While the battery of the portable device loses all charge or dies, the in-vehicle device acquires a password from the portable device when a predetermined operation to the vehicle is performed, and authenticates the acquired password to unlock the door of the vehicle. As a result, even after the battery of the portable device loses all charge or dies, the door is able to be unlocked with the security maintained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a block diagram of an example of a configuration of a door unlocking system of this example.

DETAILED DESCRIPTION OF THE PREFERRED EMBODIMENTS

Figure 2:
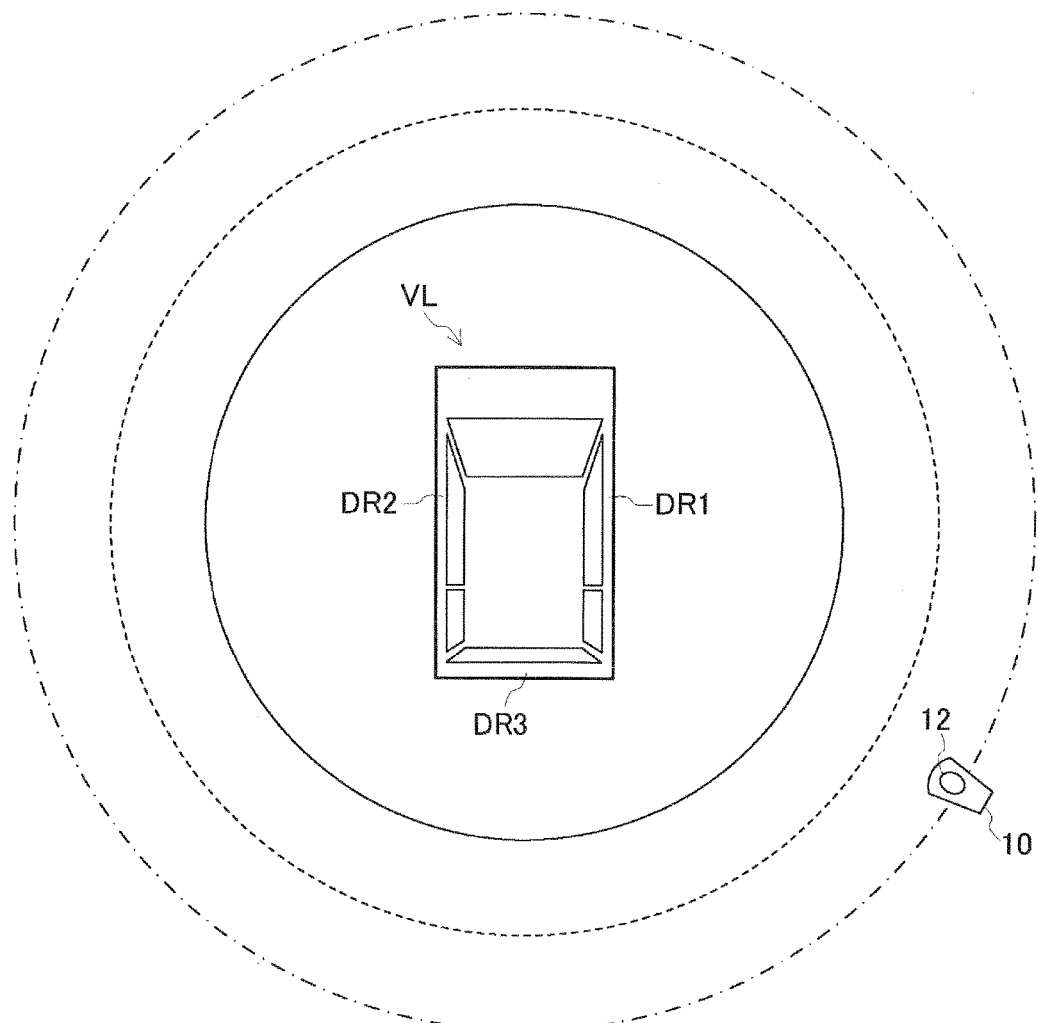
FIG. 2 is a schematic of an example of a positional relation between a communication range of a keyless entry communication mode and an electronic key.
Figure 3:
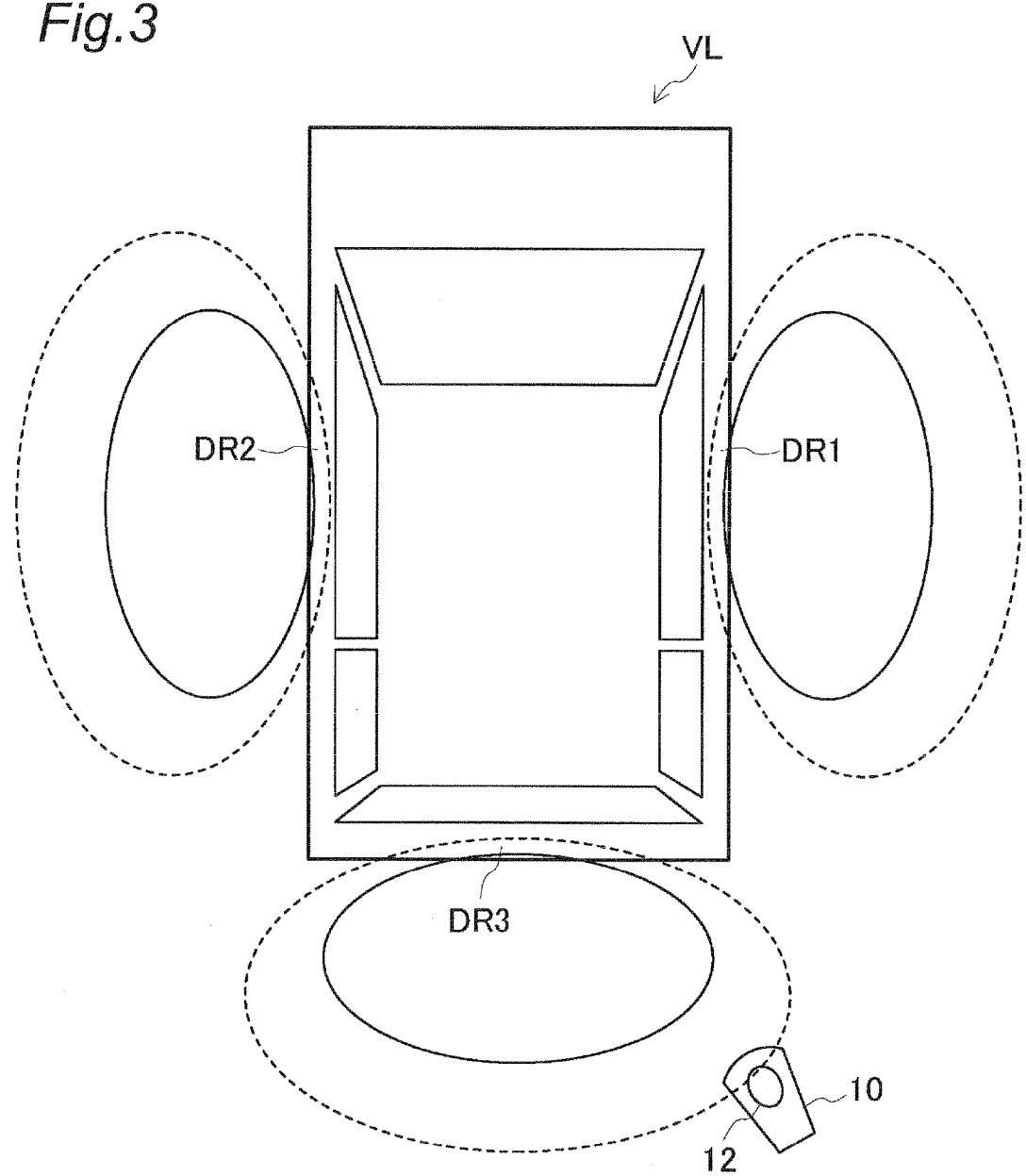
FIG. 3 is a schematic of an example of a positional relation between a communication range of an RFID communication mode and the electronic key.

Referring to FIGS. 1 to 3, a door unlocking system according to a preferred embodiment of the present invention includes an electronic key (portable device) 10 carried by a user, and a vehicle control apparatus (in-vehicle device) 30 mounted on a vehicle (automobile) VL having doors DR1 to DR3. The door DR1 is disposed on a right side portion of the vehicle VL, the door DR2 is disposed on a left side portion of the vehicle VL, and the door DR3 is disposed on a rear portion of the vehicle VL.

The electronic key 10 includes an unlock button 12 operated by a user, an active wireless circuit 14 actively performing a wireless communication in a keyless entry communication mode (first short-range wireless communication mode), and an RFID tag 16 passively performing a wireless communication in an RFID communication mode (second short-range wireless communication mode). The wireless circuit 14 includes a battery (not shown), a control circuit 18, and an antenna 20. The RFID tag 16 is a battery-less (passive) tag which includes an RFID-IC (RFID TAG-IC) 22 and an antenna 24. The unlock button 12 is connected to the control circuit 18. The control circuit 18 is connected through the I²C (Inter-Integrated Circuit) interface 26 to the RFID-IC 22.

The vehicle control apparatus 30 includes an active wireless controller 32 actively performing a wireless communication in the keyless entry communication mode, RFID readers 34a to 34c each actively performing a wireless communication in the RFID communication mode, and lock mechanisms 36a to 36c locking/unlocking the doors DR1 to DR3, respectively. The RFID readers each include an RFID-IC (RFID R/W-IC) and an antenna. The RFID reader 34a is disposed in the vicinity of the door DR1, the RFID reader 34b is disposed in the vicinity of the door DR2, and the RFID reader 34c is disposed in the vicinity of the door DR3.

The wireless controller 32 includes an ECU/BCM (Electronic Control Unit/Body Control Module) 38 and an antenna 40. The RFID reader 34a includes an RFID-IC 42a and an antenna 44a, the RFID reader 34b includes an RFID-IC 42b and antenna 44b, and the RFID reader 34c includes an RFID-IC 42c and an antenna 44c. The ECU/BCM 38 is connected through the I2C interface 46 to the RFID-ICs 42a to 42c.

In the keyless entry communication mode, a range of several meters to several dozen meters in radius is preferably set as a communication range, and communications are performed preferably by using high-frequency signals in the LF band (125 KHz band) and the UHF band (315 MHz band in Japan and US, 433 MHz band in Europe), for example. On the other hand, in the RFID communication mode, a range of approximately 1 m in radius is set as a communication range, and communications are performed by using high-frequency signals in the UHF band (900 MHz band).

Because of differences in frequency and directivity of antennas, the communication range of the keyless entry communication mode radially spreads from the center of the vehicle VL, while the communication range of the RFID communication mode spreads from each of the doors DR1 to DR3 as a base point to the outside of the vehicle VL since the RFID tag is a passive RFID tag. The communication range of the RFID communication mode is smaller than the communication range of the keyless entry communication mode (see FIGS. 2 to 3). The three communication ranges respectively covered by the RFID readers 34a to 34c are independent of each other (not overlapped with each other), and the communication range covered by the wireless controller 32 covers all the three communication ranges respectively covered by the RFID readers 34a to 34c.

The electronic key 10 has a small-sized primary battery (not shown) built-in, and the vehicle VL is equipped with a large-sized secondary battery (not shown). In the electronic key 10, the power of the primary battery is supplied only to the wireless circuit 14. In contrast, in the vehicle control apparatus 30, the power of the secondary battery is supplied to all of the wireless controller 32, the RFID readers 34a to 34c, and the lock mechanisms 36a to 36c.

If the primary battery built into the electronic key 10 has a sufficient remaining amount of charge, the keyless entry communication is performed between the electronic key 10 and the vehicle control apparatus 30. In contrast, if the primary battery built into the electronic key 10 has an insufficient remaining amount of charge, the activation of the RFID readers 34a to 34c of the vehicle control apparatus 30 is triggered by an operation of a user such as touching a vehicle door and pulling a door, and an RFID communication is started between the RFID readers 34a to 34c and the RFID tag 16. Therefore, the RFID communication is performed between the electronic key 10 and the vehicle control apparatus 30. The keyless entry communication is performed in the manner shown in FIG. 4 and the RFID communication is performed in the manner shown in FIG. 5. As a result, the doors DR1 to DR3 are unlocked through either one of the keyless entry communication and the RFID communication.

Figure 4:
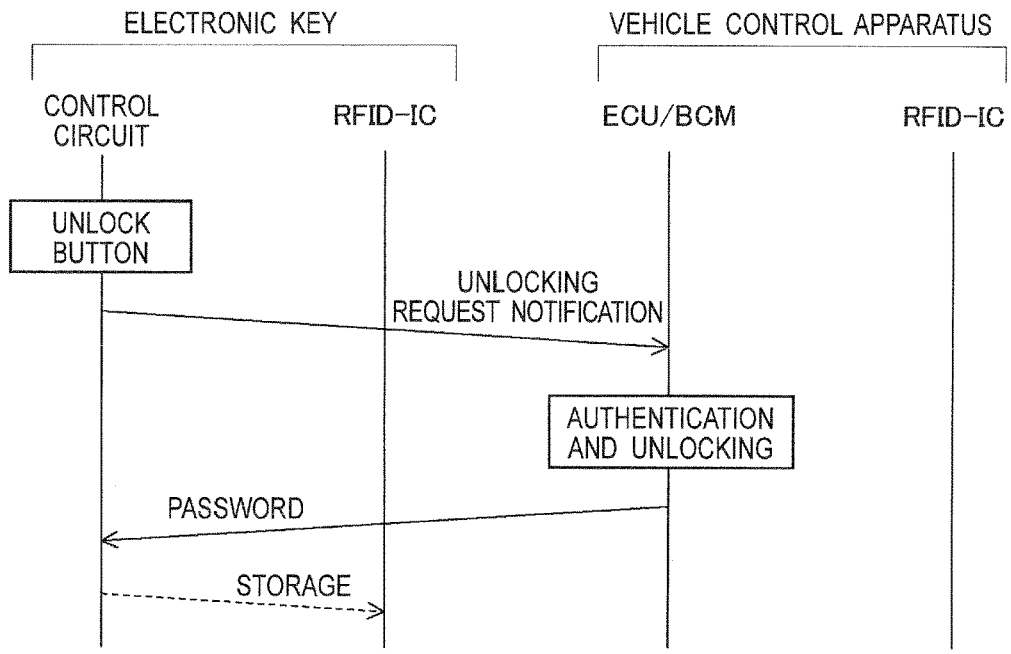
FIG. 4 is a schematic of an example of a communication operation between the electronic key and a vehicle control apparatus.

Referring to FIG. 4, when the electronic key 10 has a sufficient battery remaining amount, the keyless entry communication is started in response to an operation of the unlock button 12. When the unlock button 12 is operated, the control circuit 18 of the electronic key 10 notifies the ECU/BCM 38 on the vehicle side of an unlocking request. This notification includes a description of a unique key code.

If the key code included in the received unlocking request notification is successfully authenticated, the ECU/BCM 38 on the vehicle side generates a password (random number or cryptography key) and returns the generated password to the control circuit 18 of the electronic key 10 that is the source of notification of the unlocking request. The password is a one-time password (One Time Password) having contents updated each time. When the control circuit 18 of the electronic key 10 receives the password from the ECU/BCM 38 on the vehicle side, this password is stored through the I2C interface 26 into a memory (not shown) in the RFID-IC 22.

For example, the memory in the RFID-IC 22 preferably includes five columns respectively storing five passwords and the control circuit 18 cyclically updates a column of a write destination. Therefore, the five passwords issued in response to the latest five consecutive unlocking operations are stored in the memory.

Figure 5:
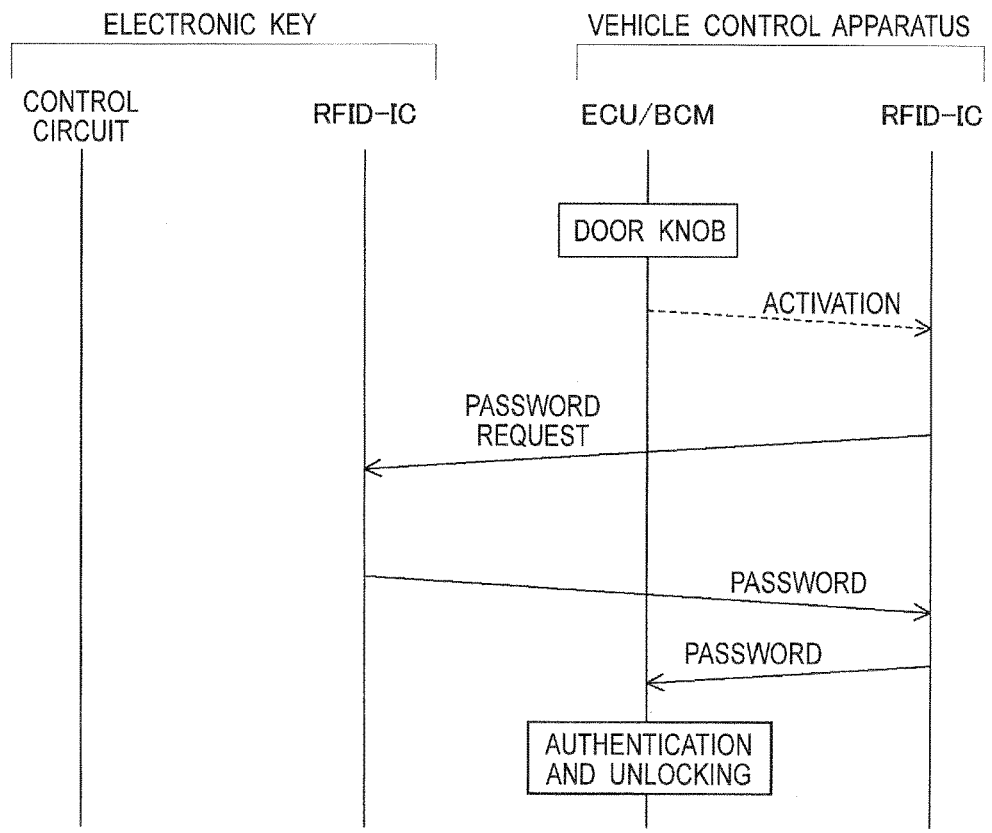
FIG. 5 is a schematic of another example of a communication operation between the electronic key and the vehicle control apparatus.

Referring to FIG. 5, when the battery of the electronic key 10 runs out of charge or dies, the RFID communication is started in response to an operation of pulling a knob or handle of any of the doors DR1 to DR3. When the knob or handle is pulled, the RFID readers 34*a* to 34*c* are activated. An authentication work is then started between any of the RFID readers and the RFID tag 16 and, if the authentication is successful, the RFID-IC 22 disposed in the RFID tag 16 returns the five passwords stored in the memory to the request source (any one of the RFID-ICs 42*a* to 42*c*). When receiving the five passwords from the electronic key 10, the request source RFID-IC internally transfers these passwords through the I2C interface 46 to the ECU/BCM 38. The ECU/BCM 38 checks the five internally transferred passwords against five passwords that have been issued and, if all the results of the checking indicate "matching," the ECU/BCM 38 unlocks the lock mechanisms 36*a* to 36*c*. The RFID readers 34*a* to 34*c* are stopped by the ECU/BCM 38 after the unlocking is completed.

Figure 6:
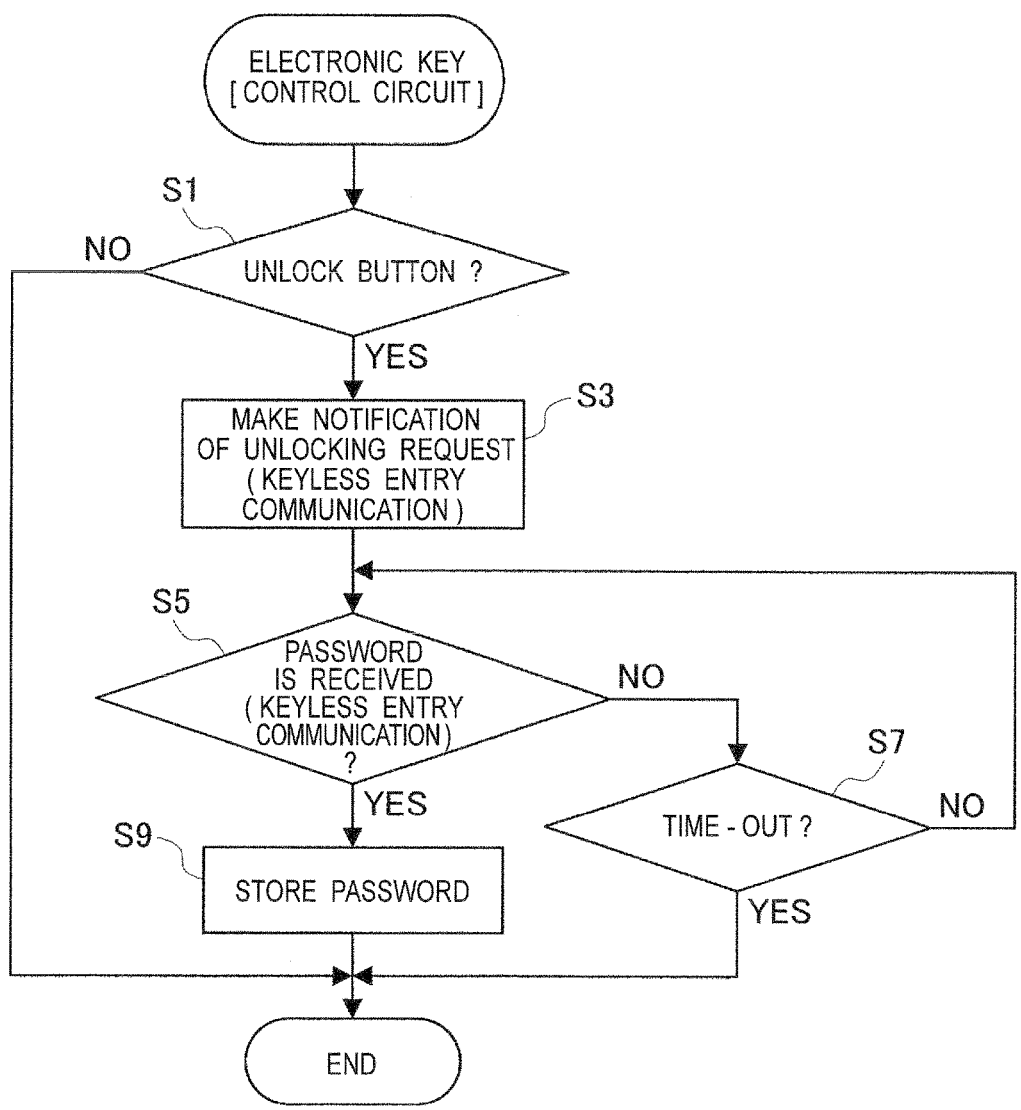
FIG. 6 is a flowchart of an example of an operation of a control circuit disposed in the electronic key.

The control circuit 18 disposed in the electronic key 10 executes a process according to a flowchart shown in FIG. 6 in association with unlocking of the doors DR1 to DR3. This process is repeatedly executed every several milliseconds, for example.

First, it is determined at step S1 whether the unlock button 12 is operated. If the determination result is NO, the process is terminated, or if the determination result is YES, the process goes to step S3. At step S3, the wireless controller 32 disposed on the vehicle VL is notified of an unlocking request. This notification includes a description of a unique key code. This notification is transmitted through a wireless communication in the keyless entry communication mode to the wireless controller 32.

When the notification is completed, it is determined at step S5 whether a password is received from the wireless controller 32 in the keyless entry communication mode, and it is determined at step S7 whether a time-out has occurred (a predetermined time has elapsed after the notification of the unlocking request). If the determination result of step S5 is YES, the process goes to step S9 and the received password is stored in the memory in the RFID-IC 22. The password is written in any one of the five columns disposed in the memory. As a result, the latest five passwords are stored in the memory. When the storage is completed, the process is terminated. If the determination result of step S7 is YES, the process is terminated without going through step S9.

Figure 7:
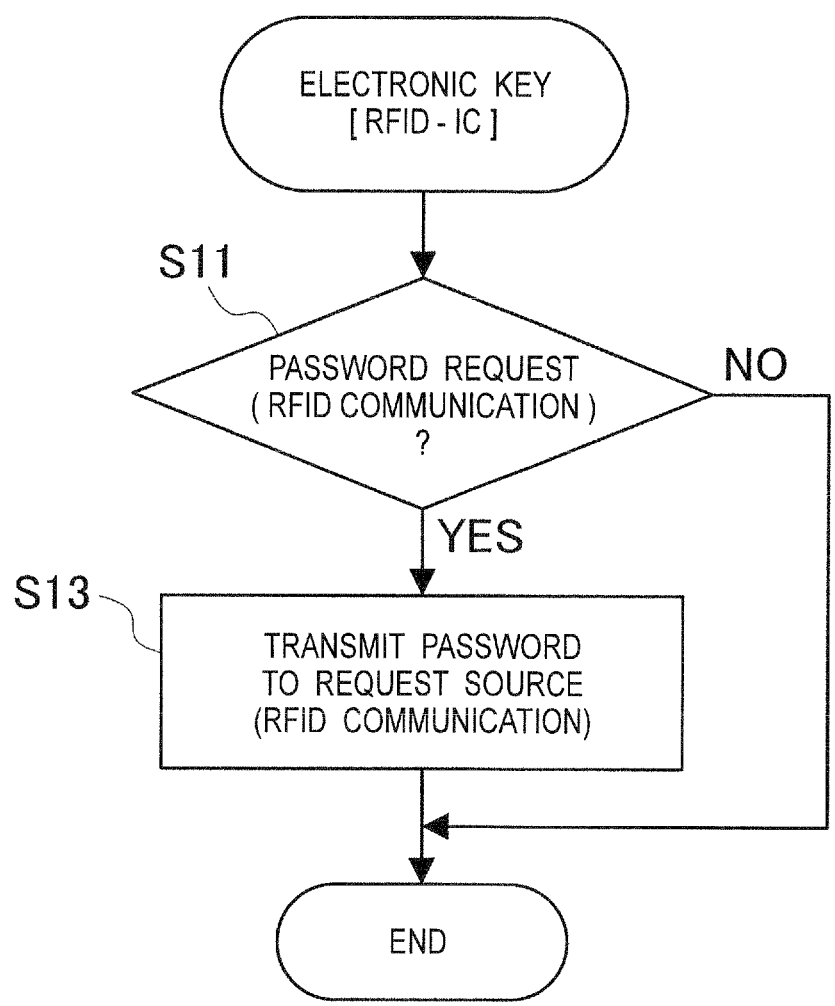
FIG. 7 is a flowchart of an example of an operation of an RFID-IC disposed in the electronic key.

The RFID-IC 22 disposed in the electronic key 10 executes a process according to a flowchart shown in FIG. 7 in association with unlocking of the doors DR1 to DR3. This process is repeatedly executed every several milliseconds, for example, in an activated state based on an externally received radio wave.

First, it is determined at step S11 whether a password request is received. If the determination result is YES, the process goes to step S13, and the five passwords stored in the memory by the process of step S9 described above are returned in the RFID communication mode to the request source. When the return is completed, the process is terminated. If the determination result of step S11 is NO, the process is terminated without going through step S13.

Figure 8:
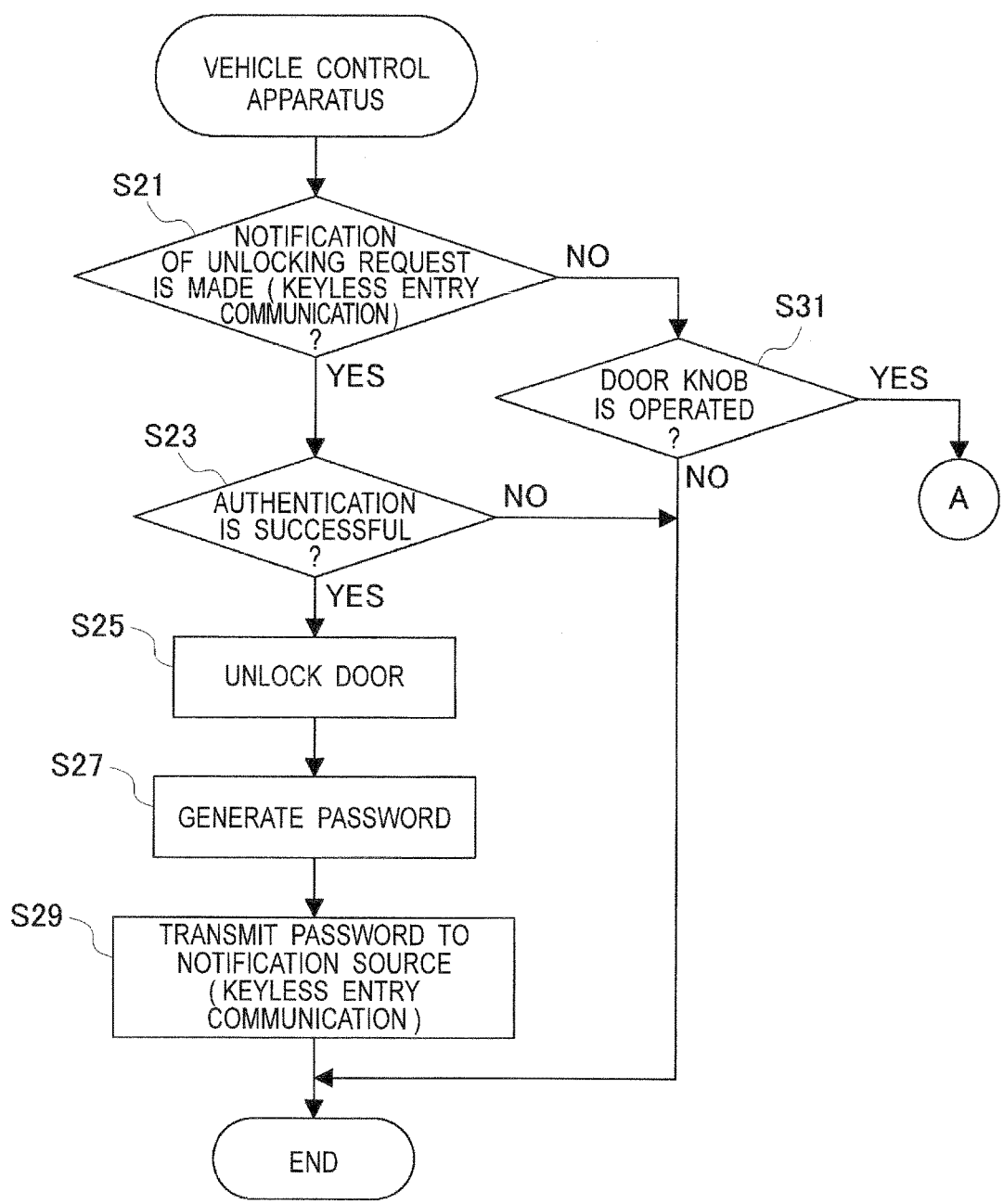
FIG. 8 is a flowchart of a portion of an operation of an ECU/BCM disposed in the vehicle control apparatus.
Figure 9:
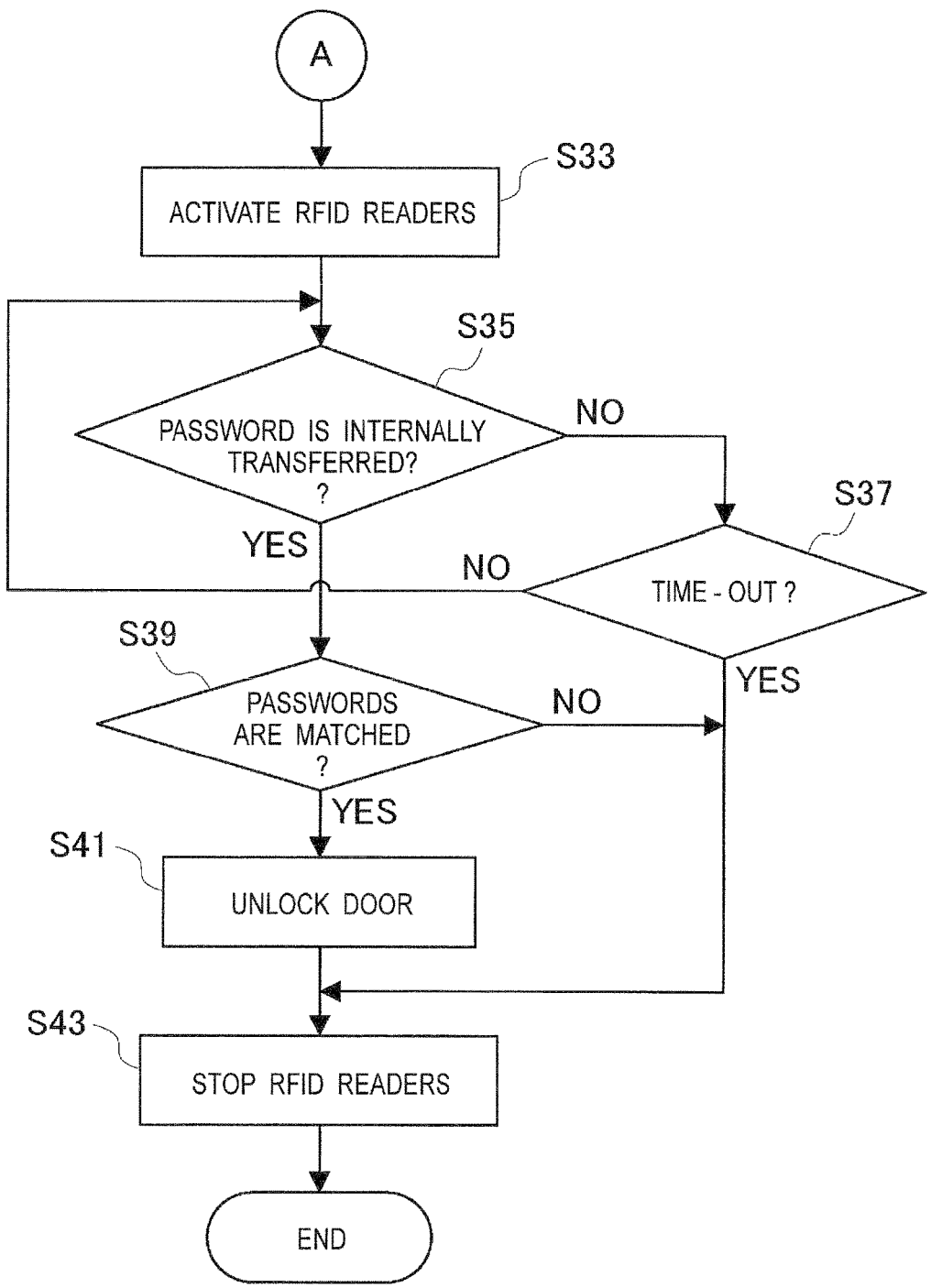
FIG. 9 is a flowchart of another portion of the operation of the ECU/BCM disposed in the vehicle control apparatus.

The ECU/BCM 38 disposed in the vehicle control apparatus 30 executes a process according to flowcharts shown in FIGS. 8 to 9 in association with unlocking of the doors DR1 to DR3. This process is also repeatedly executed every several milliseconds, for example.

It is determined at step S21 whether a notification of an unlocking operation is made in the keyless entry communication mode, and it is determined at step S31 whether a knob of any one of the doors DR1 to DR3 is pulled. If the determination result of step S21 is YES, it is determined at step S23 whether a key code described in the notification is successfully authenticated.

If either the determination result of step S23 or the determination result of step S31 is NO, the process is terminated. If the determination result of step S23 is YES, the process goes to step S25, and if the determination result of step S31 is YES, the process goes to step S33.

The lock mechanisms 36*a* to 36*c* are unlocked at step S25, a password is generated at step S27, and the generated password is issued to the electronic key 10 that is the notification source of the unlocking operation at step S29. The password is transmitted through a wireless communication following the keyless entry communication mode to the electronic key 10. When the transmission is completed, the process is terminated.

At step S33, the RFID readers 34*a* to 34*c* are activated. At step S35, it is determined whether five passwords are transferred through the I²C interface 46 from any one of the RFID-ICs 42*a* to 42*c*, and it is determined at step S37 whether a time-out has occurred (a predetermined time has elapsed after the process of step S33). If the determination result of step S35 is YES, the process goes to step S39, and it is determined whether the five transferred passwords match the five passwords that have been issued by the process of step S27.

If the determination result of step S39 is YES, the process goes to step S41 to unlock the lock mechanisms 36*a* to 36*c*. After the unlocking is completed, the RFID readers 34*a* to 34*c* are stopped at step S43, and the process is subsequently terminated. If the determination result at step S37 is YES or the determination result of step S39 is NO, the RFID readers 34*a* to 34*c* are stopped at step S43 without executing the process of step S41, and the process is subsequently terminated.

Figure 10:
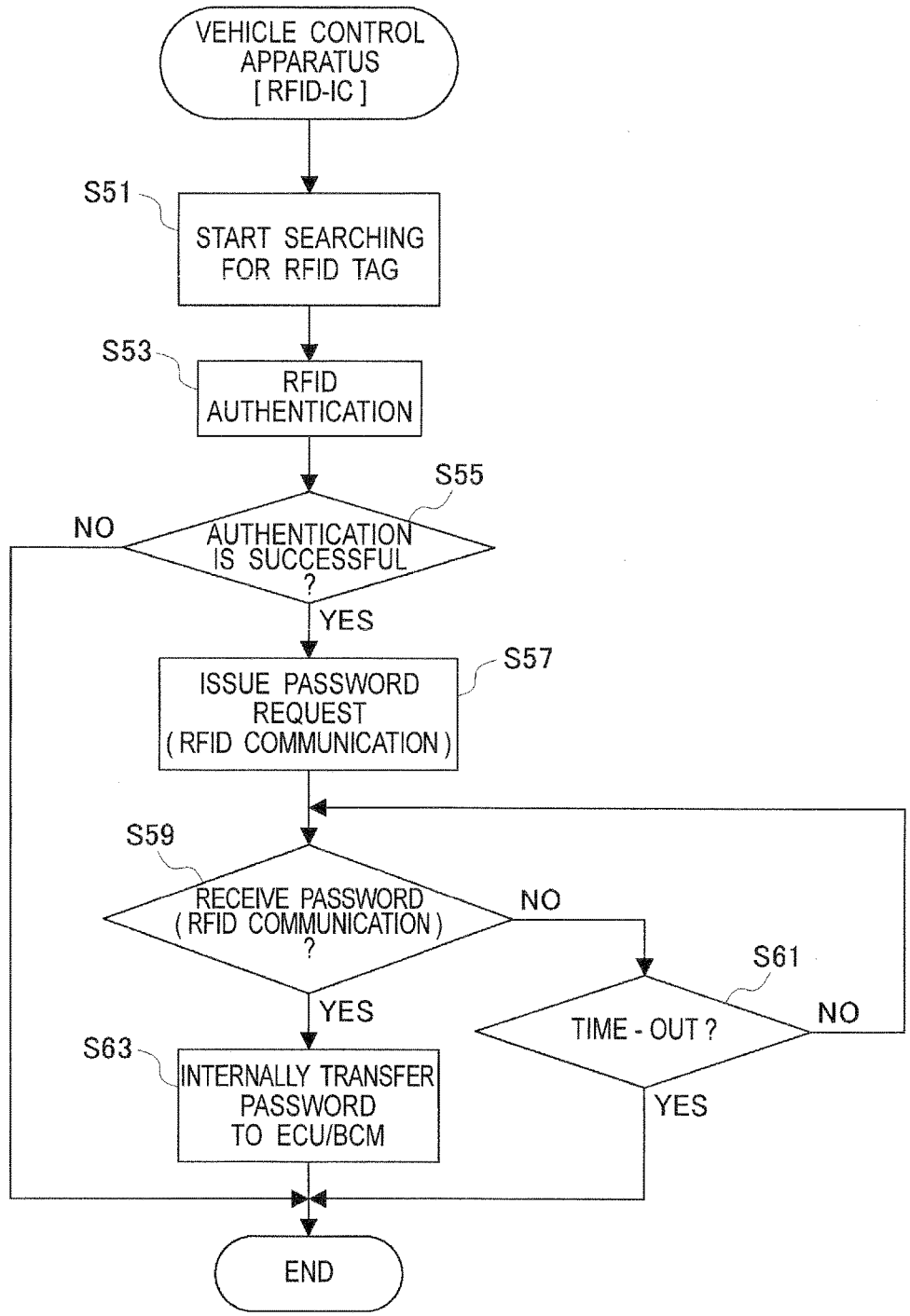
FIG. 10 is a flowchart of a portion of an operation of an RFID-IC disposed in the vehicle control apparatus.

Each of the RFID-ICs 42*a* to 42*c* disposed in the vehicle control apparatus 30 executes a process according to a flowchart shown in FIG. 10 in association with unlocking of the doors DR1 to DR3. This process is also repeatedly executed every several milliseconds, for example.

At step S51, searching for the RFID tag 16 is started. When the RFID tag 16 is found, the process goes to step S53 to execute an authentication, i.e., an RFID authentication, utilizing the unique ID of the RFID tag 16. It is determined at step S55 whether the RFID authentication is successful and, if the determination result is NO, the process is terminated, or if the determination result is YES, the process goes to step S57.

At step S57, a password request is issued in the RFID communication mode. It is determined at step S59 whether the five passwords are received from the RFID tag 16 in the RFID communication mode, and it is determined at step S61 whether a time-out has occurred (a predetermined time has elapsed after the issuance of the password request).

If the determination result of step S59 is YES, the process goes to step S63, and the five received passwords are internally transferred via the I2C interface 46 to the ECU/BCM 38. When the transfer is completed, the process is terminated. In contrast, if the determination result of step S61 is YES, the process is terminated without going through step S63.

As can be seen from the above description, the electronic key 10 is carried by a user and actively performs a wireless communication following the keyless entry communication mode and passively performs a wireless communication following the RFID communication mode. The vehicle control apparatus 30 is mounted on the vehicle VL having the doors DR1 to DR3 and actively performs a wireless communication following the keyless entry communication mode and a wireless communication following RFID communication mode. The ECU/BCM 38 disposed in the vehicle control apparatus 30 communicates in the keyless entry communication mode with the electronic key 10 to unlock the doors DR1 to DR3 (S21 to S25) and issues a password to the electronic key 10 in association with an unlocking process (S27 to S29). The RFID-IC 22 of the electronic key 10 stores the issued password in the memory (S9). When an operation of puling a door knob or handle is performed, the RFID-ICs 42a to 42c disposed in the vehicle control apparatus 30 acquire in the RFID communication mode from the electronic key 10 the passwords issued by the ECU/BCM 38 through the keyless entry communication and memorized in the electronic key 10 (S51 to S53, S57) and authenticate the acquired passwords to unlock the doors DR1 to DR3 (S35, S39 to S41).

Therefore, while the primary battery built into the electronic key 10 has a sufficient remaining amount of charge, the vehicle control apparatus 30 communicates in the keyless entry communication mode with the electronic key 10 to unlock the doors DR1 to DR3 and issues a password to the electronic key 10. In contrast, while the primary battery built into the electronic key 10 has an insufficient remaining amount of charge, the vehicle control apparatus 30 acquires from the electronic key 10 the passwords of multiple times used in the previous keyless entry communications when an operation of pulling a door knob is performed, and checks and authenticates the acquired passwords against the passwords memorized on the vehicle side to unlock the doors DR1 to DR3. As a result, even after the battery of the electronic key 10 loses all charge or dies, the doors DR1 to DR3 are able to be unlocked with the security maintained.

In this example, the password is issued in response to an operation of the unlock button 12 disposed on the electronic key 10. However, the wireless controller 32 disposed on the vehicle control apparatus 30 may repeatedly issue a response request to the electronic key 10 and, when the electronic key 10 returns a response signal thereto, the password may be issued from the vehicle control apparatus 30 to the electronic key 10.

In this example, the doors DR1 to DR3 are simultaneously unlocked both when the unlock button 12 is operated and when the operation of pulling a door knob is performed. However, at least when the operation of pulling a door knob is performed, only the door having this door knob may exclusively be unlocked Although the activation of the RFID readers is triggered by pulling a door of a vehicle in this example, for example, a door may be provided with a button or a sensor for activating the RFID readers and the activation of the RFID readers may be triggered by pushing this button or sensing a motion of a user getting in a vehicle with the sensor.

The passwords transferred and checked through the RFID communication are not limited to the past five passwords and, for example, only the last one password may be checked or, for example, only the third last password may be subjected to checking etc.

Although this example is described in terms of a three-door type vehicle having three doors in the left and right side portions and the rear portion (hatch) of the vehicle, the vehicle may be a five-door type vehicle. In the case of the five-door type, an RFID reader may be disposed for each of five doors, or a common RFID reader may be disposed for two doors (for front and rear seats) on the right side and a common RFID reader may be disposed for two doors (for front and rear seats) on the left side.

Although the RFID readers are disposed in respective doors in this example, one RFID reader may be disposed per vehicle.

Correlation between claims and features of preferred embodiments of the present invention will hereinafter be described. S21 to S25 of the flowchart correspond to a first unlocking actuator or a first unlocking step of claims. S27 to S29 of the flowchart correspond to a password generator or an issuing step of claims. S9 of the flowchart corresponds to a storage or a storing step of claims. S51 to S61 of the flowchart correspond to a password acquirer or an acquiring step recited in the claims. S35 and S39 to S41 of the flowchart correspond to a second unlocking actuator or a second unlocking step recited in the claims. S1 to S3 of the flowchart correspond to an indicator recited in the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A door unlocking system comprising:
a portable device carried by a user, the portable device actively performing a wireless communication following a first short-range wireless communication mode and passively performing a wireless communication following a second short-range wireless communication mode; and
an in-vehicle device mounted on a vehicle including a door, the in-vehicle device actively performing a wireless communication following the first short-range wireless communication mode and a wireless communication following the second short-range wireless communication mode; wherein
the in-vehicle device includes a first unlocking actuator communicating in the first short-range wireless communication mode with the portable device to unlock the door and a password generator issuing a password to the portable device in association with a process of the first unlocking actuator;
the portable device includes a storage storing a password issued by the password generator and an indicator notifying the in-vehicle device of an unlocking operation by the user in the first short-range wireless communication mode;

the in-vehicle device further includes a password acquirer acquiring a password stored by the storage in the second short-range wireless communication mode when a predetermined operation to the vehicle is performed, and a second unlocking actuator authenticating the password acquired by the password acquirer to unlock the door; and the first unlocking actuator unlocks the door in response to a notification from the indicator.

2. The door unlocking system according to claim 1, wherein a communication range following the first short-range wireless communication mode is larger than a communication range following the second short-range wireless communication mode; and the password generator issues the password in the first short-range wireless communication mode.

3. The door unlocking system according to claim 1, wherein the password generator updates contents of the password for each issuance; and the password acquirer acquires a plurality of passwords already issued by the password generator for each authentication.

4. The door unlocking system according to claim 1, wherein the predetermined operation is an operation of pulling a door knob or door handle.

5. The door unlocking system according to claim 1, wherein the portable device is an electronic key.

6. The door unlocking system according to claim 1, wherein the in-vehicle device is a vehicle control apparatus mounted on the vehicle.

7. The door unlocking system according to claim 1, wherein the vehicle is an automobile.

8. The door unlocking system according to claim 5, wherein the electronic key includes an unlock button, an active wireless circuit and an RFID tag.

9. The door unlocking system according to claim 8, wherein the active wireless circuit includes a battery, a control circuit and an antenna.

10. The door unlocking system according to claim 9, wherein the RFID tag is a passive tag including an RFID-IC and an antenna.

11. The door unlocking system according to claim 10, wherein the control circuit is connected to the RFID-IC through an Inter-Integrated Circuit interface.

12. The door unlocking system according to claim 6, wherein the vehicle control apparatus includes an active wireless controller, RFID readers, and lock mechanisms.

13. The door unlocking system according to claim 12, wherein each of the RFID readers includes an RFID-IC and an antenna.

14. The door unlocking system according to claim 12, wherein the active wireless controller includes an Electronic Control Unit/Body Control Module and an antenna.

15. The door unlocking system according to claim 14, wherein the Electronic Control Unit/Body Control Module is connected to RFID-ICs of the RFID readers through an Inter-Integrated Circuit interface.

16. The door unlocking system according to claim 1, wherein a range of the first short-range wireless communication mode is several meters to several dozen meters.

17. The door unlocking system according to claim 1, wherein a range of the second short-range wireless communication mode is approximately 1 meter.

18. The door unlocking system according to claim 5, wherein the electronic key includes a primary battery and the vehicle includes a secondary battery larger than the primary battery.

19. A door unlocking method performed by a door unlocking system including a portable device carried by a user, the portable device actively performing a wireless communication following a first short-range wireless communication mode and passively performing a wireless communication following a second short-range wireless communication mode, and an in-vehicle device mounted on a vehicle including a door, the in-vehicle device actively performing a wireless communication following the first short-range wireless communication mode and a wireless communication following the second short-range wireless communication mode, the portable device including an indicator notifying the in-vehicle device of an unlocking operation by the user in the first short-range wireless communication mode, the method comprising:

a first unlocking step in which the indicator notifies the in-vehicle device of an unlocking operation by the user in the first short-range wireless communication mode, and the in-vehicle device unlocks the door in response to a notification from the indicator;

an issuing step in which the in-vehicle device issues a password to the portable device in association with a process of the first unlocking step;

a storing step in which the portable device stores a password issued in the issuing step;

an acquiring step in which the in-vehicle device acquires a password stored in the storing step in the second short-range wireless communication mode when a predetermined operation to the vehicle is performed; and a second unlocking step at which the in-vehicle device authenticates the password acquired at the acquiring step to unlock the door.

* * * * *